(12) United States Patent
Hinque

(10) Patent No.: US 8,573,270 B2
(45) Date of Patent: Nov. 5, 2013

(54) SELF-INFLATING TIRE AND PRESSURE REGULATOR

(75) Inventor: Daniel Paul Luc Marie Hinque, Habay-la-Neuve (BE)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 13/221,433

(22) Filed: Aug. 30, 2011

(65) Prior Publication Data

US 2013/0048177 A1    Feb. 28, 2013

(51) Int. Cl.
*B60C 23/12* (2006.01)

(52) U.S. Cl.
USPC .......................................... 152/426; 152/419

(58) Field of Classification Search
USPC .......................................... 152/419, 423–426
See application file for complete search history.

(56) References Cited

U.S. PATENT DOCUMENTS

| | | | |
|---|---|---|---|
| 2,095,489 A | 10/1937 | Cotton | |
| 7,225,845 B2* | 6/2007 | Ellmann | 152/426 |
| 8,042,586 B2* | 10/2011 | Losey et al. | 152/426 |
| 8,113,254 B2* | 2/2012 | Benedict | 152/426 |
| 8,235,081 B2* | 8/2012 | Delgado et al. | 152/419 |
| 2004/0112495 A1 | 6/2004 | Weise | |
| 2011/0120611 A1 | 5/2011 | Hansen | |
| 2013/0048176 A1* | 2/2013 | Hinque | 152/419 |

FOREIGN PATENT DOCUMENTS

| | | |
|---|---|---|
| DE | 102005031099 | 1/2007 |
| EP | 1604842 | 12/2005 |
| FR | 2318747 | 2/1977 |
| WO | 2007134556 | 11/2007 |

* cited by examiner

*Primary Examiner* — Jason Bellinger
(74) *Attorney, Agent, or Firm* — June E. Rickey

(57) ABSTRACT

A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to a regulator device. The regulator device regulates the inlet air flow to the air tube and the outlet air flow to the tire cavity.

12 Claims, 16 Drawing Sheets

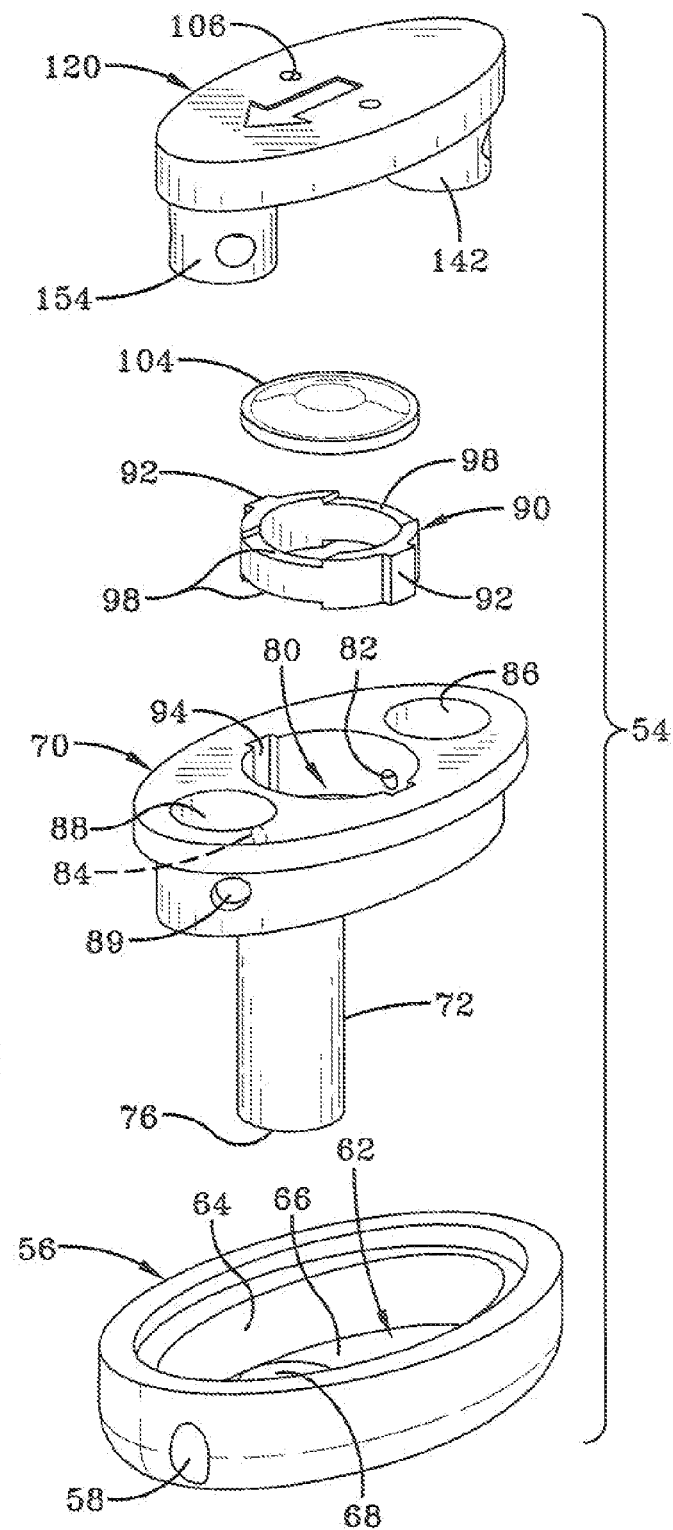

SELF-INFLATING TIRE AND PRESSURE REGULATOR

FIELD OF THE INVENTION

The invention relates generally to self-inflating tires and, more specifically, to a pump mechanism and pressure regulator for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect a self-inflating tire assembly comprising a tire mounted to a rim, the tire having a tire cavity, first and second sidewalls extending respectively from first and second tire bead regions to a tire tread region. An air tube is connected to the tire and defining an air passageway having an inlet end and an outlet end, the air tube being composed of a flexible material operative to allow a portion of the air tube segment near a tire footprint to substantially close the annular passageway. A regulator device is connected to the inlet end and the outlet end of the air tube, the regulator device including a regulator body mounted in the tire, and a cap connected to the regulator body, wherein the regulator body is connected to a duct having a first end located in the tire cavity, and a second end connected to a chamber formed between the cap and the regulator body. A flexible ring is mounted in the chamber and has one or more slots. A pressure membrane is mounted over said ring. The regulator body further includes an inlet port for fluid communication with an outlet of end of the air tube and the chamber, and an outlet port for fluid communication with the chamber and an inlet end of the air tube, and an ambient air inlet in fluid communication with the chamber and the pressure membrane. The ring is positioned to seal the inlet port of the regulator body. The regulator cap has a flanged portion about a recessed chamber, wherein the flanged portion is positioned for sealing engagement with the pressure membrane, and said recessed chamber being in fluid communication with the outlet port of the regulator body.

The invention provides in a second aspect a pressure regulator for an inflated tire having a tire cavity and mounted to a rim and connected to an inlet end and an outlet end of a peristaltic pump. The pressure regulator comprises a regulator device connected to the inlet end and the outlet end of the air tube, the regulator device including a regulator body and a cap connected to the regulator body, wherein the regulator body is connected to a duct having a first end located in the tire cavity, and a second end connected to a chamber formed between the cap and the regulator body. A flexible ring is mounted in the chamber and has one or more slots. A pressure membrane is mounted over said ring. The regulator body further has an inlet port for fluid communication with an outlet of end of the air tube and the chamber, and an outlet port for fluid communication with the chamber and an inlet end of the air tube, and an ambient air inlet in fluid communication with the chamber and the pressure membrane. The ring is positioned to seal the inlet port of the regulator body. The regulator cap having a flanged portion about a recessed chamber, wherein the flanged portion is positioned for sealing engagement with the pressure membrane, and said recessed chamber being in fluid communication with the outlet port of the regulator body.

The invention provides in a third aspect a self-inflating tire assembly comprising a tire mounted to a rim, the tire having a tire cavity, first and second sidewalls extending respectively from first and second tire bead regions to a tire tread region. An air tube is connected to the tire, wherein each air tube defines an air passageway, each air tube being composed of a flexible material operative to allow a portion of the air tube segment near a tire footprint to substantially open and close the annular passageway. A regulator device is connected to an inlet end of the air tube, the regulator device includes a regulator body mounted in the tire sidewall, the regulator body having an outer duct having a distal end located within the tire cavity, wherein the duct has an internal bore that is in fluid communication with the tire cavity and an internal chamber of the regulator body. A pressure membrane is mounted within the internal chamber of the regulator body. A cap is mounted within the internal chamber of the regulator body and has a flanged end engageable with the pressure membrane, wherein the flanged end surrounds an internal cavity, the cap has an upper surface having one or more air holes that extend from the upper surface and are in fluid communication with the internal cavity, said internal cavity in fluid communication with an outlet port of the regulator body, wherein the outlet port is in fluid communication with an inlet end of the air tube.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 6A is an enlarged view of a portion of FIG. 5 illustrating the tube being compressed in the tire bead area, while

FIG. 9 is an exploded perspective view of the pressure regulator of FIG. 7;

FIG. 12A is a cross-sectional view of the pressure regulator of FIG. 7 taken along lines 12-12, and shown in the closed position, while

DETAILED DESCRIPTION OF THE INVENTION

Figure 1:
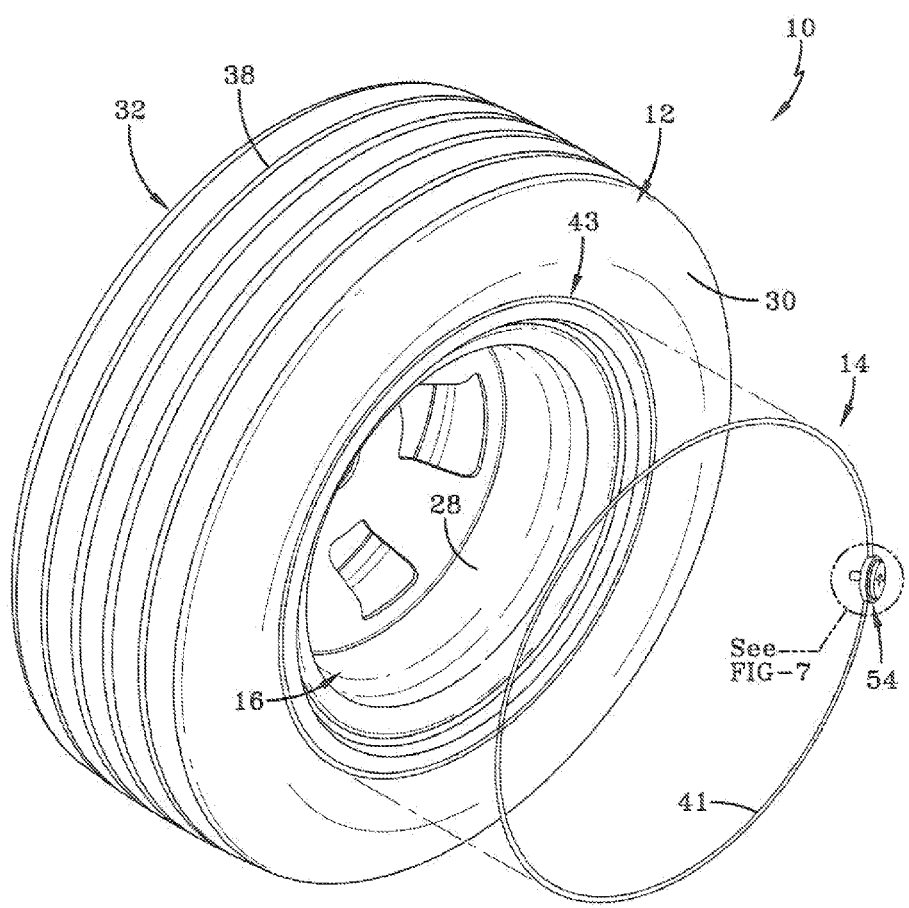
FIG. 1 is an isometric view of tire and rim assembly showing a reversible peristaltic pump assembly.
Figure 5:
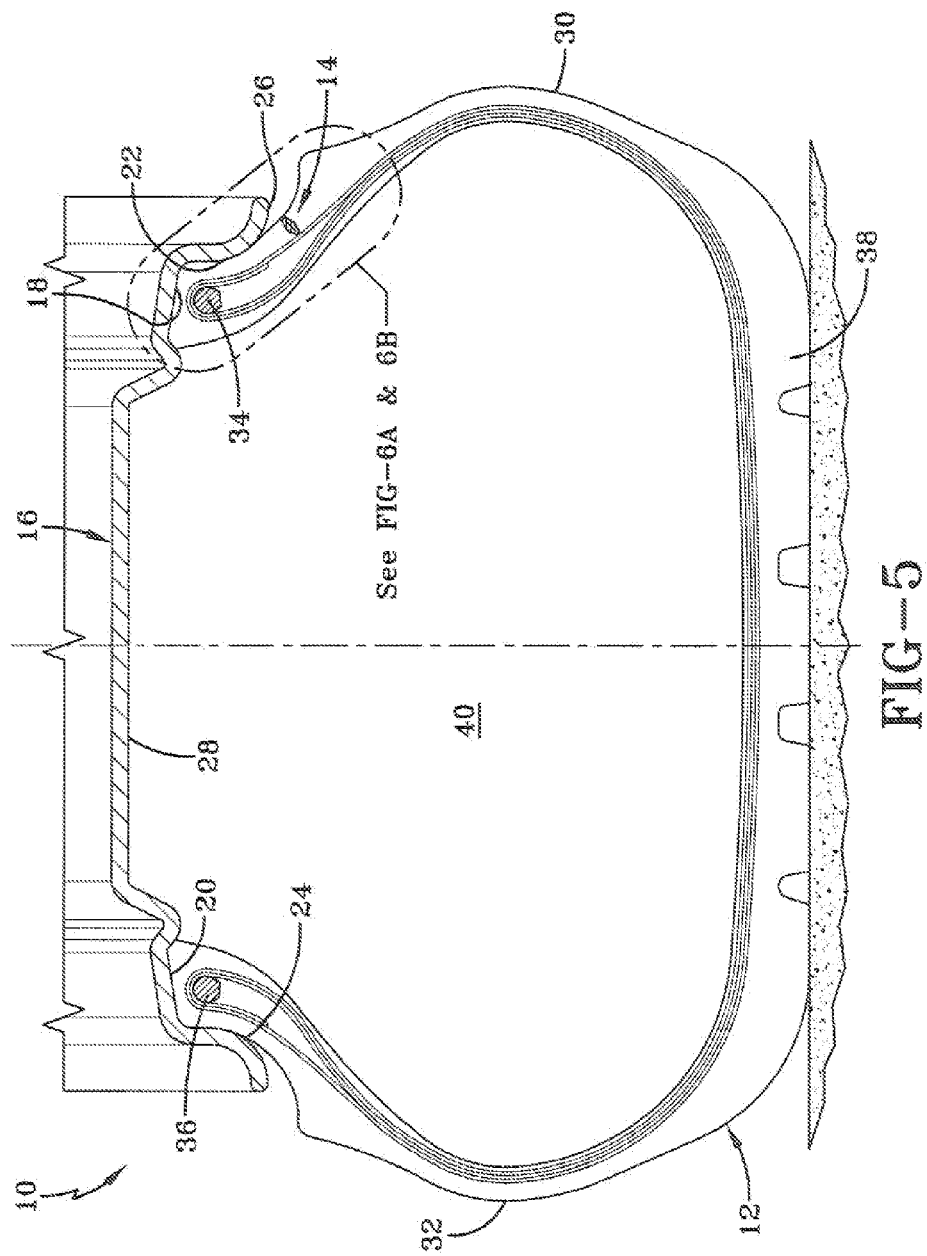
FIG. 5 is a partial section view through the tire under load at road surface.

Referring to FIGS. 1 and 5, a tire assembly 10 includes a tire 12, a reversible peristaltic pump assembly 14, and a tire wheel 16. The tire mounts in a conventional fashion to a wheel having a pair of rim mounting surfaces 18, 20 located adjacent outer rim flanges 22, 24. The outer rim flanges 22, 24 have an outer rim surface 26. An annular rim body 28 connects the rim flanges 22, 24 and supports the tire assembly as shown. The tire is of conventional construction, having a pair of sidewalls 30, 32 extending from opposite bead areas 34, 36 to a crown or tire tread region 38. The tire and rim enclose a tire cavity 40.

Figure 2:
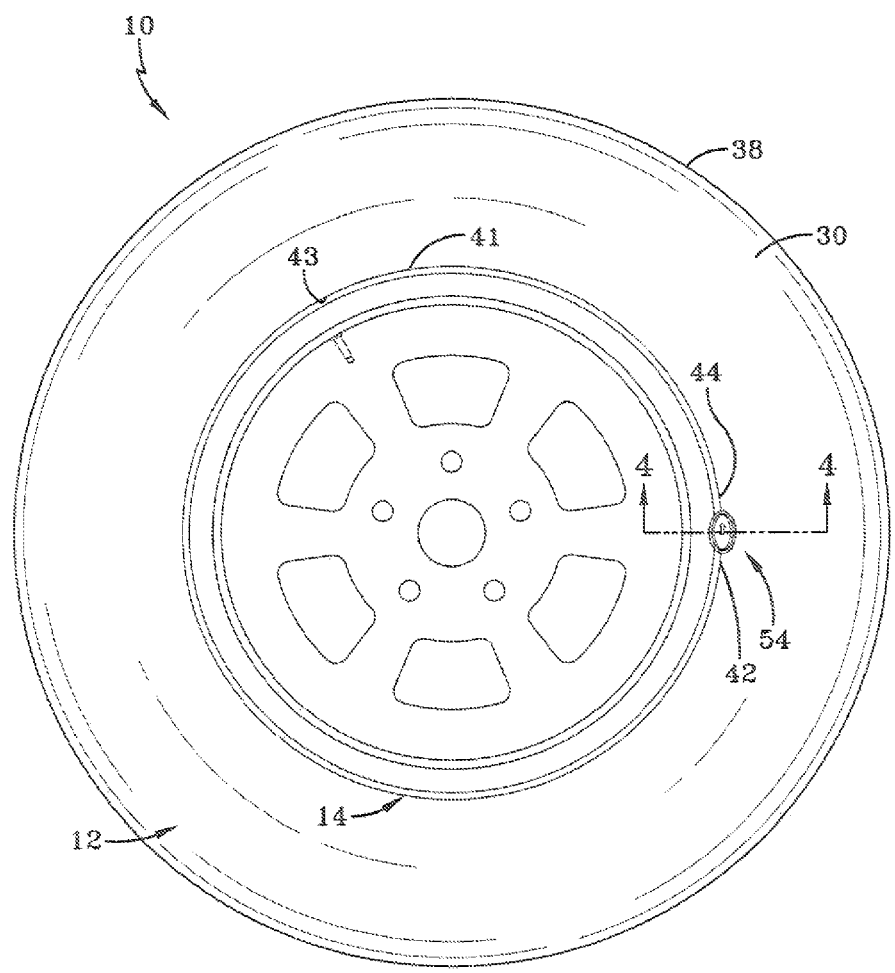
FIG. 2 is a side view of the tire of FIG. 1.

As shown in FIGS. 1, 2 and 3, the peristaltic pump assembly 14 includes a pump 41 that is mounted in a passageway 43 located in the sidewall area of the tire, preferably near the bead region. The air passageway 43 may be molded into the sidewall of the tire during vulcanization or molded post cure. The passageway is preferably annular in shape. The pump 41 has a first end or inlet end 42 and a second end or outlet end 44 joined together by a regulator device 54. The first end 42 and the second end 44 are co located, so that the pump body is about 360 degrees in circumference. The pump 41 is comprised of a tube body formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized.

The regulator device 54 is shown in FIG. 4 and FIGS. 7-15. The regulator device 54 functions to regulate both the inlet and outlet flow of pump 41. The regulator device 54 includes an optional outer cover 56 that may be molded into a green tire and then cured or inserted post-cure. The optional outer cover 56 has two lateral holes 58, 60 for fluid communication with the inlet tube and outlet tube of the pump 41 as described in more detail, below. The cover further comprises an inner cavity 62 formed by sidewalls 64 and bottom wall 66. A hole 68 is located in bottom wall.

A regulator body 70 is received within the inner cavity 62 of the cover 56. The regulator body 70 has an outer duct 72 having a first end 74 which is connected to the regulator body and a distal end 76 that is received within the bottom hole 68 of the inner cavity 62. The outer duct 72 is sized to have a sufficient length so that the distal end 76 of the duct is in fluid communication with the tire cavity 40. The outer duct 72 has a central bore 78 that extends from the first end 74 to the distal end 76. The first end 74 of the outer duct 72 is connected to a main chamber 80 that is preferably centrally located within the regulator body 70. The internal chamber has two opposed holes 82,84 leading to a left chamber 86 and a right chamber 88 located on either side of the main chamber 80. The left chamber 86 has a lateral hole 87 and configured to align with hole 60 in cover. The right chamber 88 has a lateral hole 89 and configured to align with hole 58 in cover.

A ring valve 90 is received within the main chamber 80 and has flanged ends 92 aligned for reception in slots 94 in the sidewalls of the chamber. The ring valve 90 is a ring shaped member that is formed of a flexible material such as, but not limited to, rubber, elastomer, plastic or silicone. The ring valve 90 has one or more lateral recessed slots 98. The outer wall 100 of the ring valve is positioned for mating engagement with holes 82, 84 in main chamber 80.

A pressure membrane 104 is positioned over the ring valve 90. The pressure membrane is a disk shaped member made of a flexible material such as, but not limited to, rubber, elastomer, plastic or silicone. The pressure membrane is responsive to the pressure of the outside atmosphere via holes 106, and the tire cavity pressure communicated via duct 72.

Figure 12A:
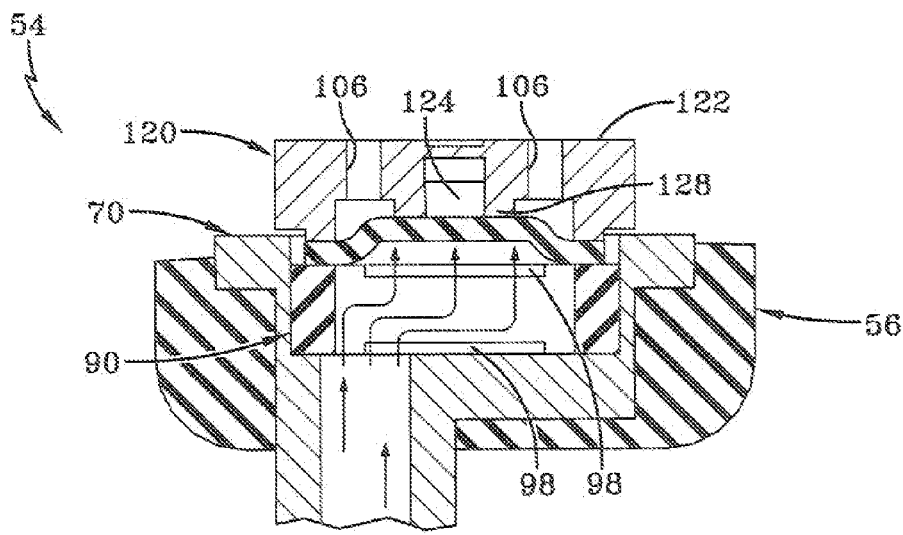
Figure 12B:
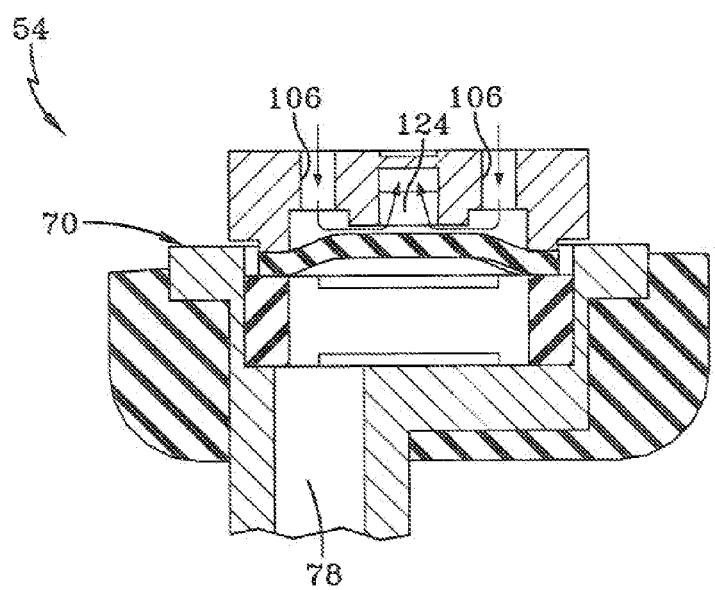
FIG. 12B is shown in the open position.
Figure 13:
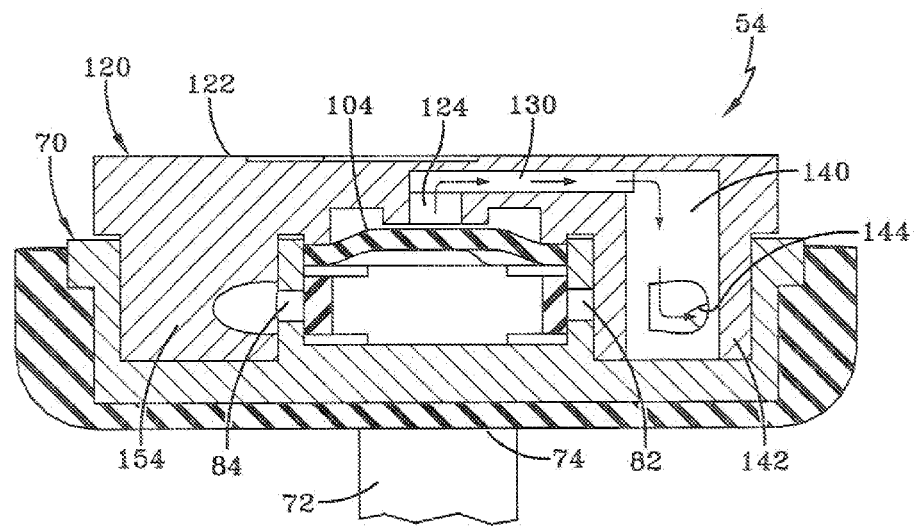
FIG. 13 is a cross-sectional view of the pressure regulator of FIG. 7 taken along lines 13-13.
Figure 14:
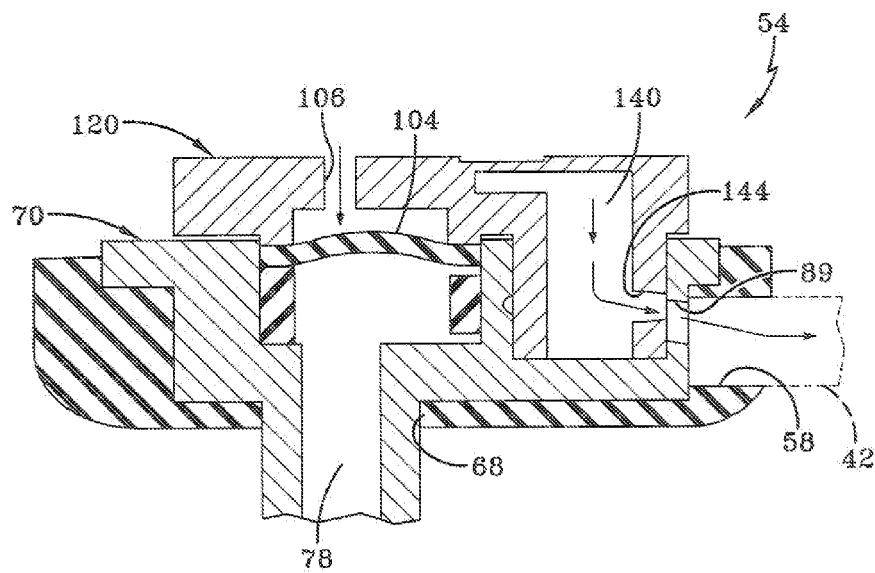
FIG. 14 is a cross-sectional view of the pressure regulator of FIG. 8 taken along lines 14-14.

A regulator cap 120 is connected to the regulator body forming internal pathways for managing the airflow within the regulator device. This regulator cap 120 can be installed two ways (i.e. reversible) in the regulator body 70 to allow the pumping for a given tire rotating direction. The regulator cap has an upper flanged surface 122 having one or more air holes 106 that extend from the upper surface and down through the regulator cap and into a recessed chamber 124. The recessed chamber 124 has a flanged portion 128 that surrounds the recessed chamber 124 and is positioned for engagement with the pressure membrane. The pressure membrane can engage the flanged portion 128 forming a seal which prevents air flow from port 106 from passing through the regulator device. As shown in FIG. 13, the recessed chamber 124 is connected to a transverse passageway 130 in the regulator cap, that directs airflow to an outlet port 140 formed by a first flanged end 142. The outlet port has an exit hole 144 that connects to the right chamber lateral hole 89 of the regulator body which is further connected with cover hole 58 connected to an inlet end 42 of the pump. Thus air from the outside can enter holes 106 as shown in FIG. 12b. The airflow is blocked from further entering the recessed chamber 124 if the tire cavity pressure is high so that the pressure membrane is seated against the flanged portion 128 of the recessed chamber 124. If the tire cavity pressure is low, the pressure membrane unseats from the flanged portion and air may enter the recessed chamber as shown in FIG. 12b. FIGS. 13 and 14 illustrate the air traveling through passageway 130 into port 140 and out the exit hole 144, through the regulator hole 89, through cover hole 89 and into pump inlet tube end 42 as shown in FIG. 14.

Figure 15:
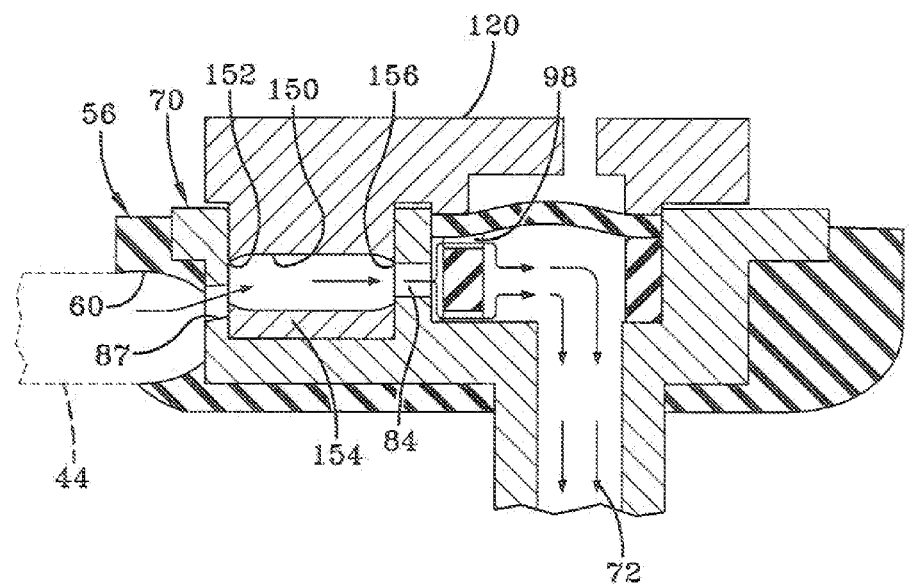
FIG. 15 is a cross-sectional view of the pressure regulator of FIG. 8 taken along lines 15-15.
Figure 16:
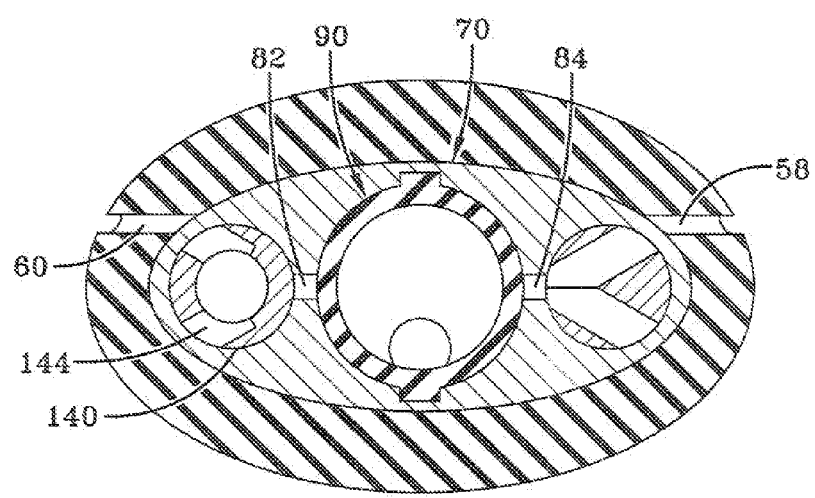
FIG. 16 is a cross-sectional view of the pressure regulator of FIG. 8 taken along lines 16-16.

FIG. 15 illustrates how air from the peristaltic pump outlet end 44 travels through the regulator device and then is pumped into the tire. Air from the pump outlet end enters the regulator device 54 through the cover hole 60 and then through the aligned regulator hole 87 of regulator 70. Air then enters the regulator cap 120 through a channel 150 located in a second flanged end 154 of the regulator cap. The channel 150 has an inlet 152 aligned with the regulator hole 87 and an outlet 156 aligned with hole 82 located in the left chamber of the regulator body. The hole 82 is sealed by ring valve, which blocks both holes 82, 84 as shown in FIG. 15 to prevent airflow from escaping the tire cavity. In order to pump air into the tire cavity, air from the pump tube enters the duct 72 when the pump pressure unseats the ring valve from the regulator hole 82. When the ring valve is unseated by the pump pressure, the air passes through the slots of the ring valve and then to the duct 72 which ports the air into tire cavity 40.

System Operation

Figure 3A:
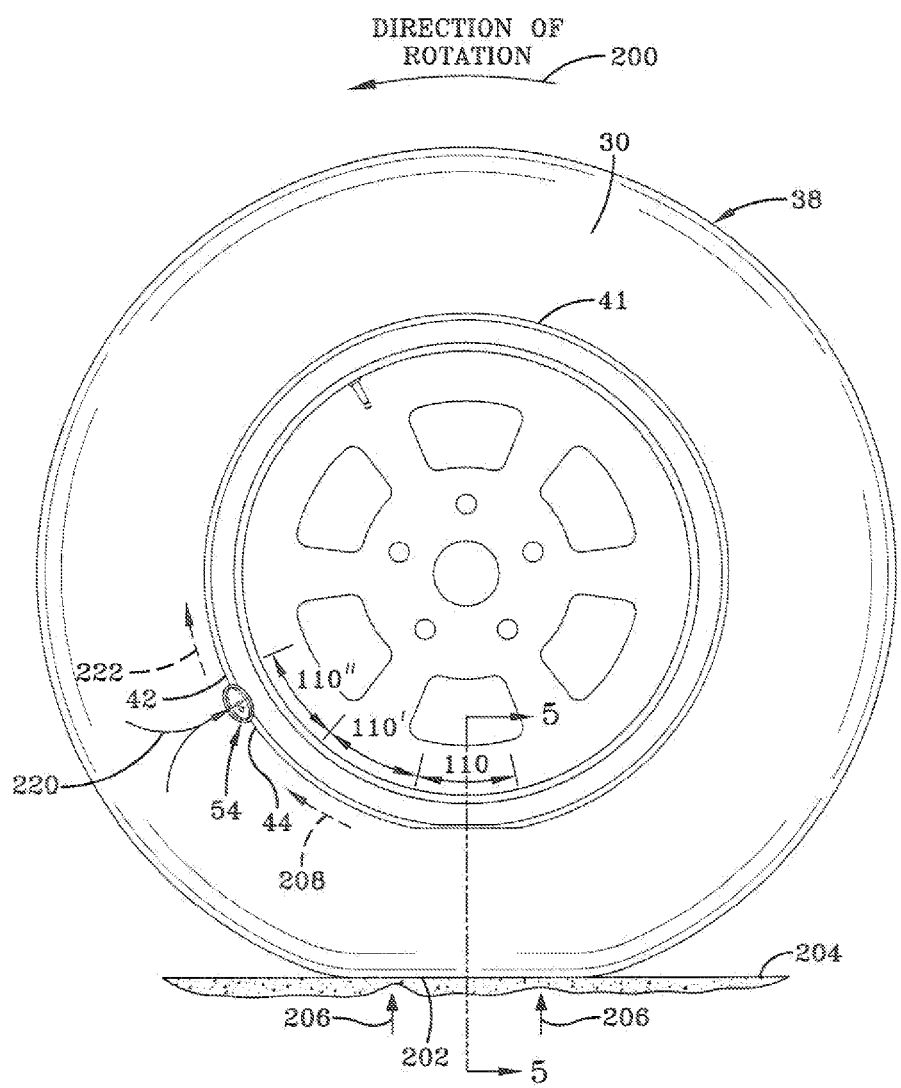
FIG. 3a illustrates a side view of the tire, wheel, tubing, and valves showing operation of the pump to the tire cavity when the tire rotates counterclockwise.

As will be appreciated from FIG. 3A, the regulator device 54 is in fluid communication with the inlet end and the outlet end of the circular air tube 42. As the tire rotates in a direction of rotation 200, a footprint 202 is formed against the ground surface 204. A compressive force 206 is directed into the tire from the footprint 202 and acts to flatten a segment 110 of the pump 42. Flattening of the segment 110 of the pump 41 forces a portion of air located between the flattened segment 110 and the regulator device 54, in the direction shown by arrow 208 towards the regulator device 54.

As the tire continues to rotate in direction 200 along the ground surface 204, the pump tube 41 will be sequentially flattened or squeezed segment by segment 110, 110', 110" etc in a direction 208 which is opposite to the direction of tire rotation 200. The sequential flattening of the pump tube 41 segment by segment causes the column of air located between the flattened segments and the regulator device 54 to be pumped into the regulator device 54 and then into the tire cavity.

With the tire rotating in direction 200, flattened tube segments are sequentially refilled by air 220 flowing into the regulator device 54 along the pump tube 42 in the direction 222 as shown by FIG. 3A. The regulator device controls the inflow of air into the pump. If the tire pressure is low, the regulator device will allow the air to enter the regulator device from the pump and then into the tire. Air from the pump tube outlet enters regulator body through cover hole and then through the cap passageway 150. The air pressure generated by the pumping mechanism unseats the ring valve from the regulator hole 82. When the ring valve is unseated by the pump pressure, the air passes through the slots of the ring valve into the chamber and then to the duct 72 which ports the air into tire cavity 40. The regulator may also fill the pump with air at the same time the tire is being pumped.

If the tire pressure is sufficient, the regulator device will block flow from entering the pump inlet. The pressure membrane is responsive to the cavity tire pressure and engages the flanged portion 128 of the regulator cap forming a seal which prevents air flow from port 106 from passing through the regulator device. The pressure membrane material properties are adjusted to have the desired tire pressure settings.

The regulator device also functions to prevent flow from the tire cavity into the pump ends via the ring seal which blocks hole 82.

Figure 4:
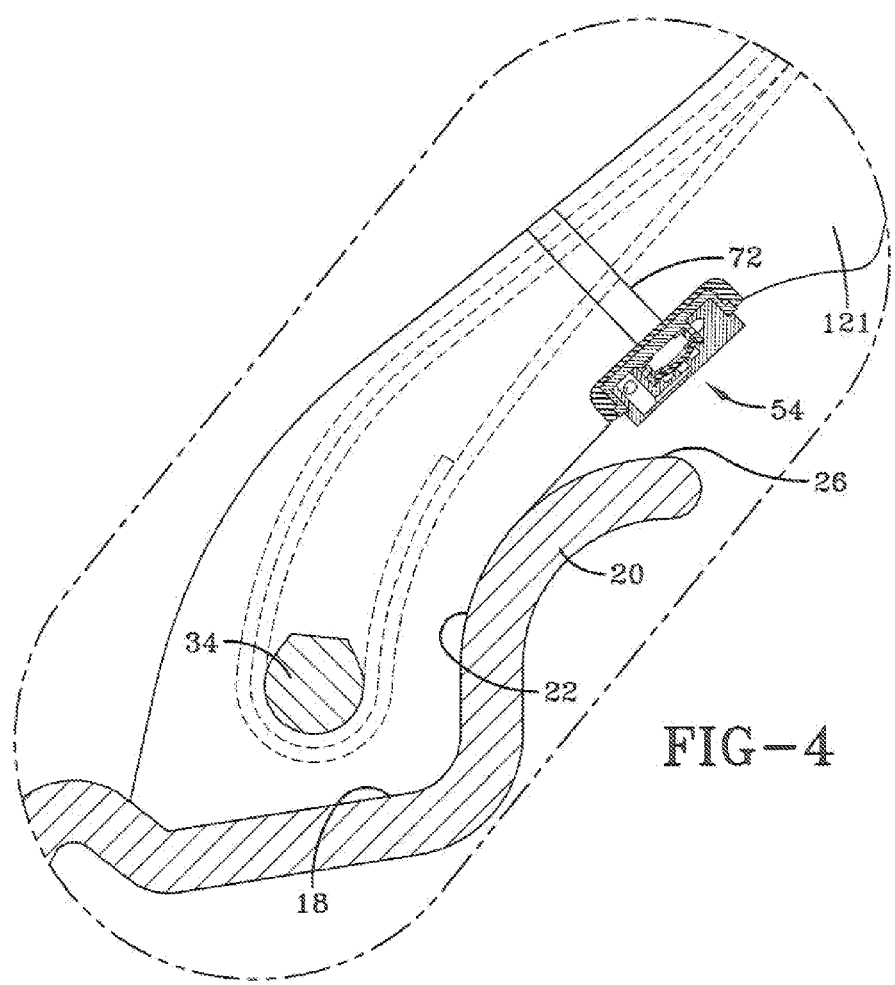
FIG. 4 is an enlarged cross sectional view of a portion of the tire bead area and wheel assembly with the pressure regulator shown mounted in the tire sidewall.
Figure 6A:
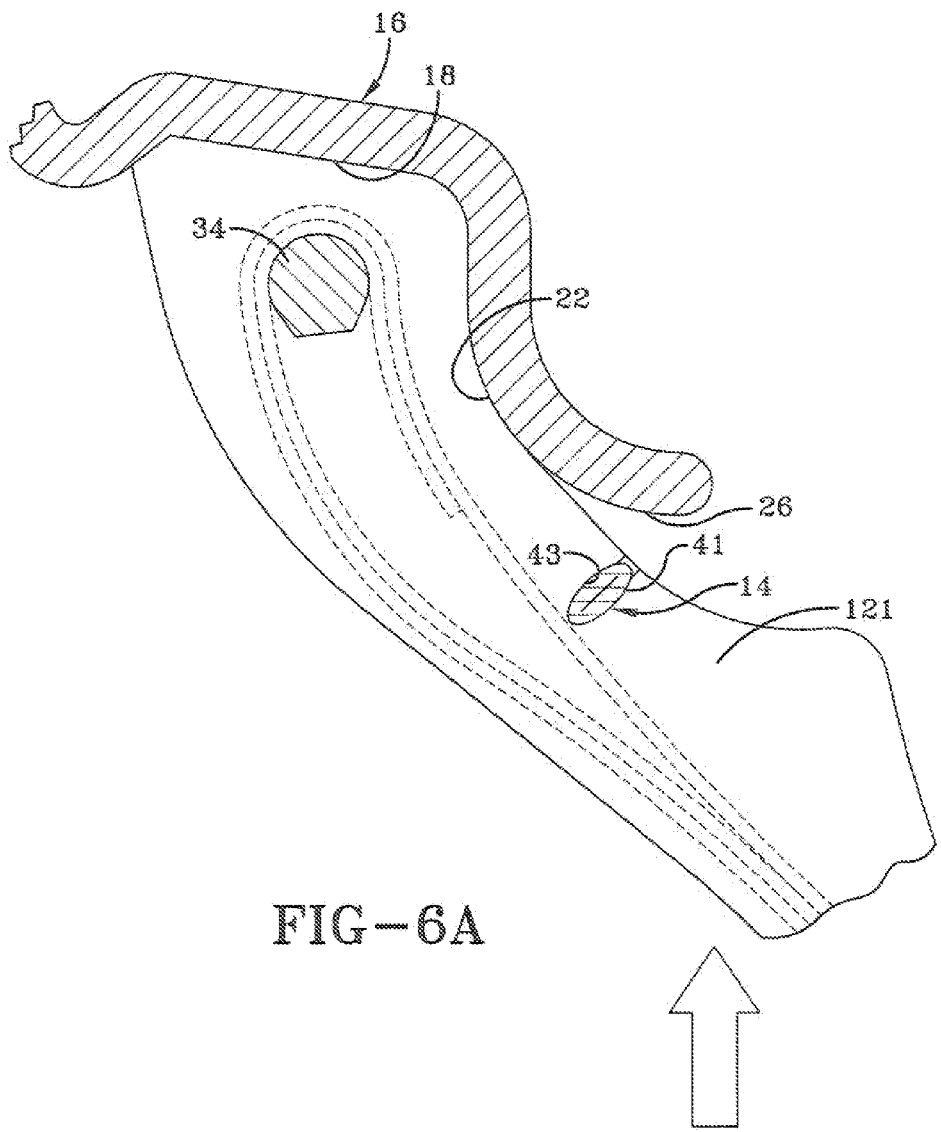
Figure 6B:
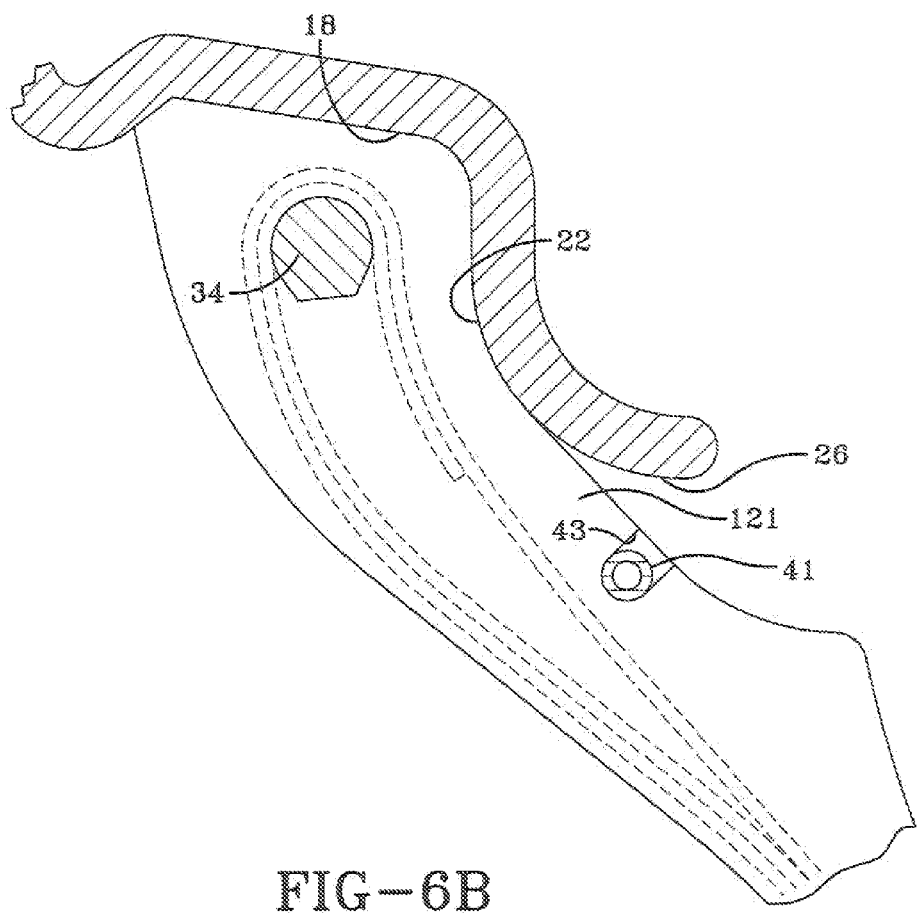
FIG. 6B illustrates the tube in an open state.
Figure 7A:
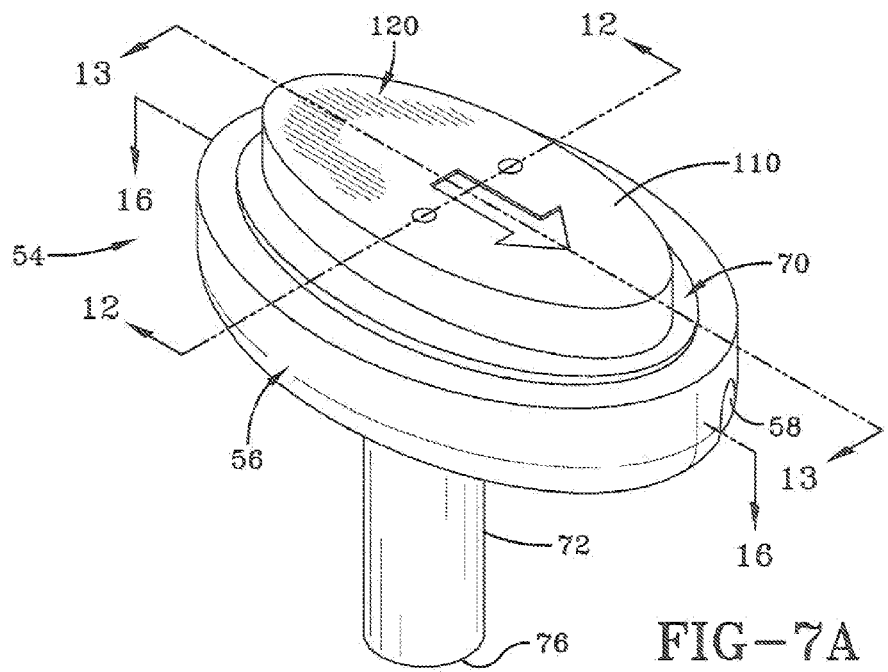
FIG. 7 is a perspective view of a pressure regulator.
Figure 7B:
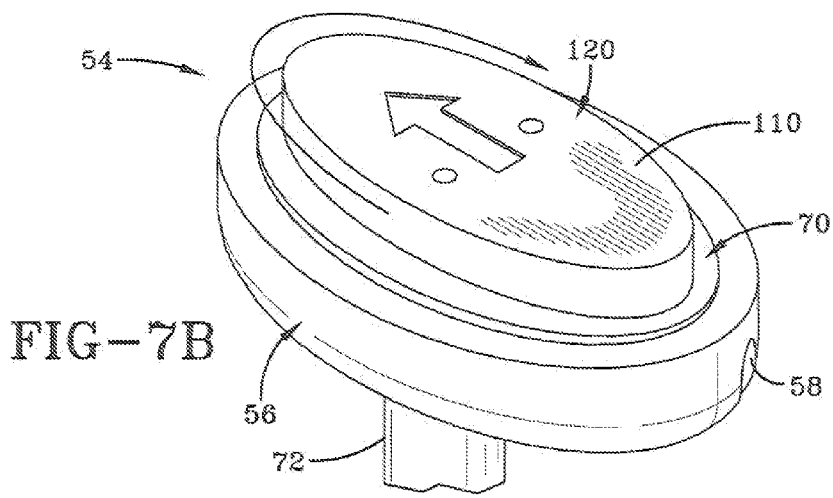
Figure 8A:
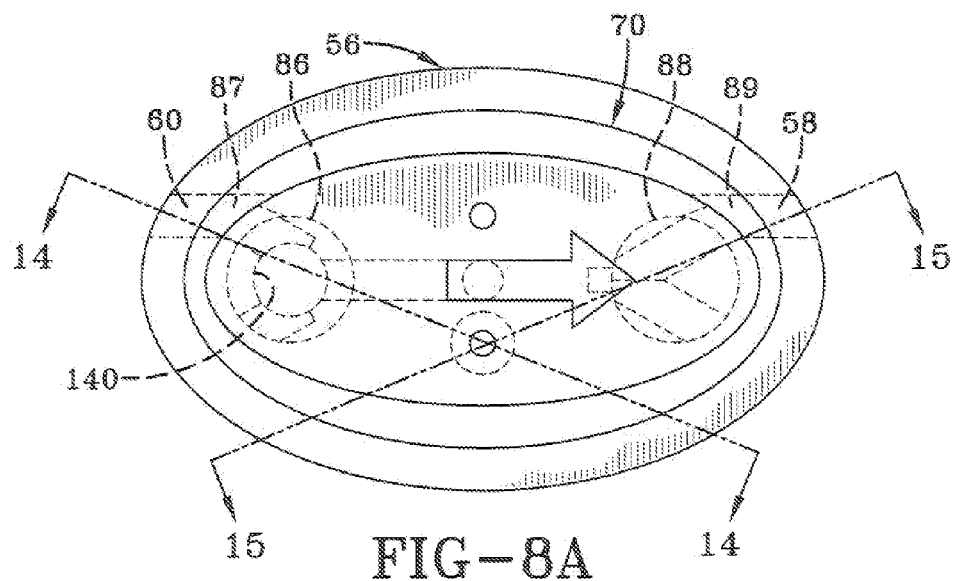
FIG. 8 is a top view of the pressure regulator of FIG. 7.
Figure 8B:
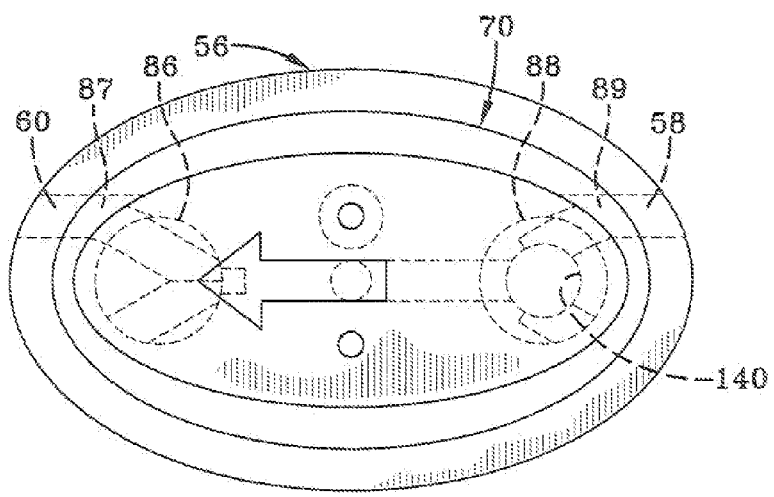
Figure 10:
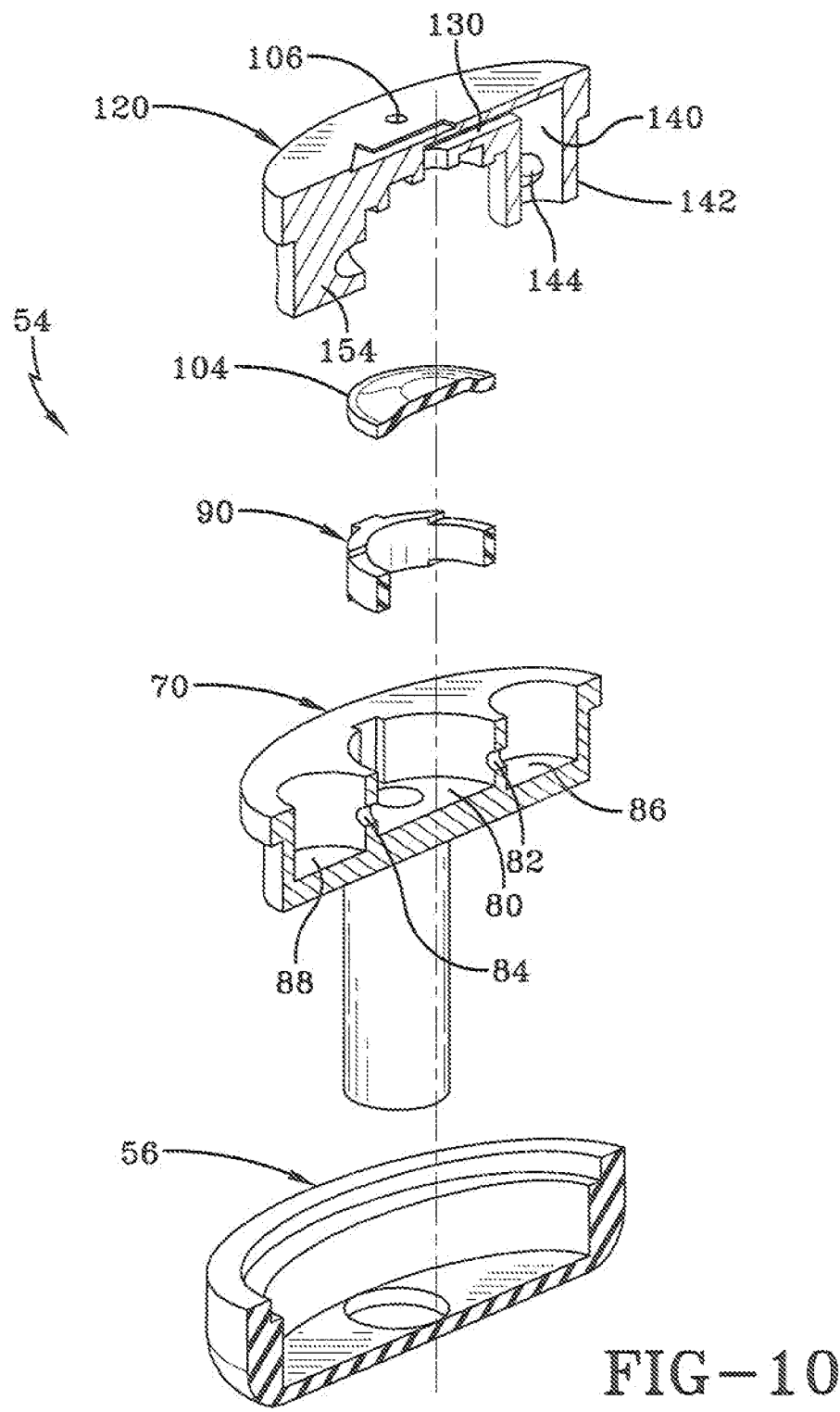
FIG. 10 is an exploded cross-sectional view of the pressure regulator of FIG. 7 taken along lines 13-13.
Figure 11:
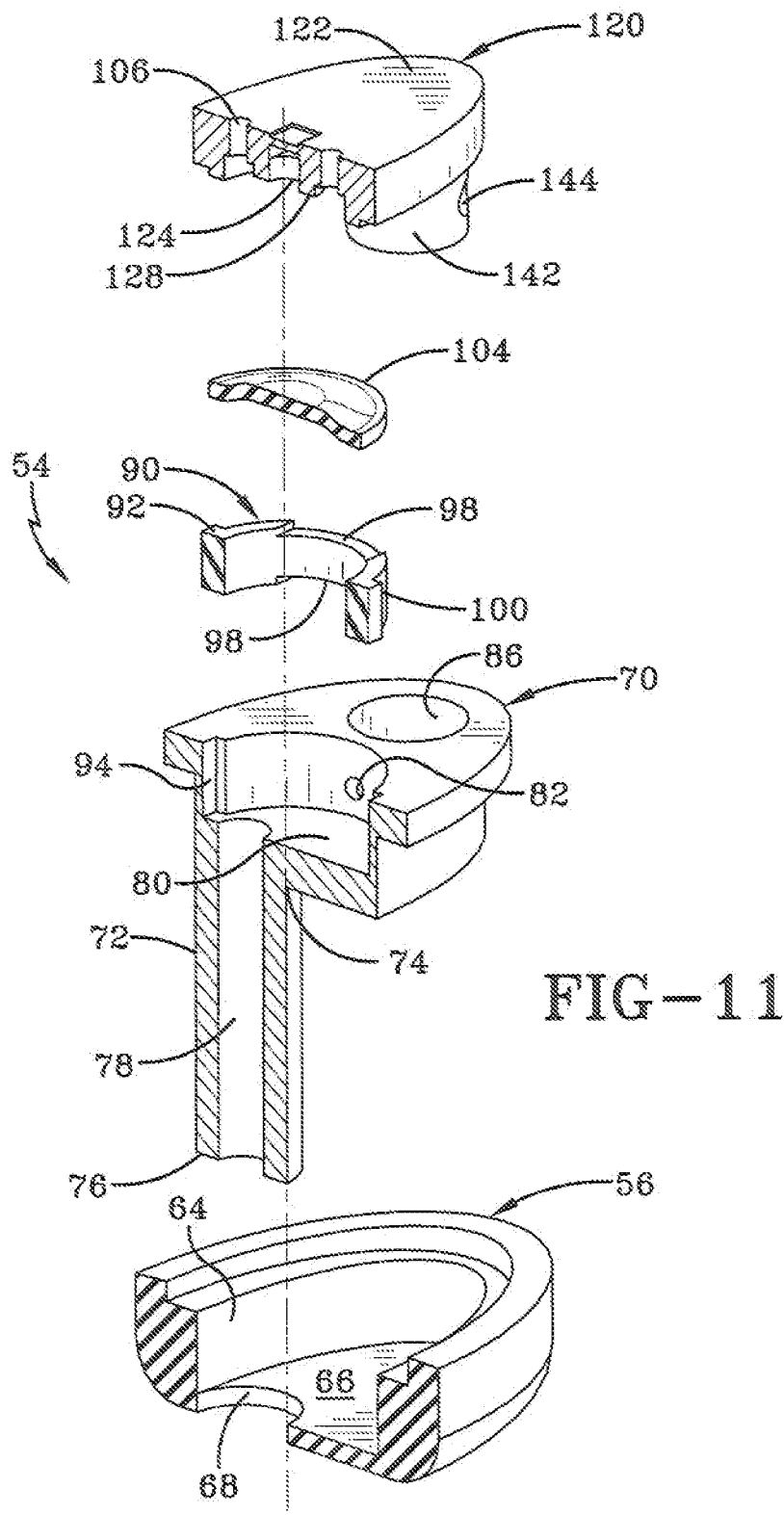
FIG. 11 is an exploded cross-sectional view of the pressure regulator of FIG. 7 taken along lines 12-12.

The location of the peristaltic pump assembly in the tire will be understood from FIGS. 4-6. In one embodiment, the peristaltic pump assembly 14 is positioned in the tire sidewall, radially outward of the rim flange surface 26 in the chafer 120. So positioned, the air tube 42 is radially inward from the tire footprint 202 and is thus positioned to be flattened by forces directed from the tire footprint as described above. The segment 110 that is opposite the footprint 202 will flatten from the compressive force 206 from the footprint 202 pressing the tube segment against the rim flange surface 26. Although the positioning of the tube 42 is specifically shown as between a chafer 120 of the tire at the bead region 34 and the rim surface 26, it is not limited to same, and may be located at any region of the tire such as anywhere in the sidewall or tread. The diametric sizing of the peristaltic pump air tube 41 is selected to span the circumference of the rim flange surface 26.

Figure 3B:
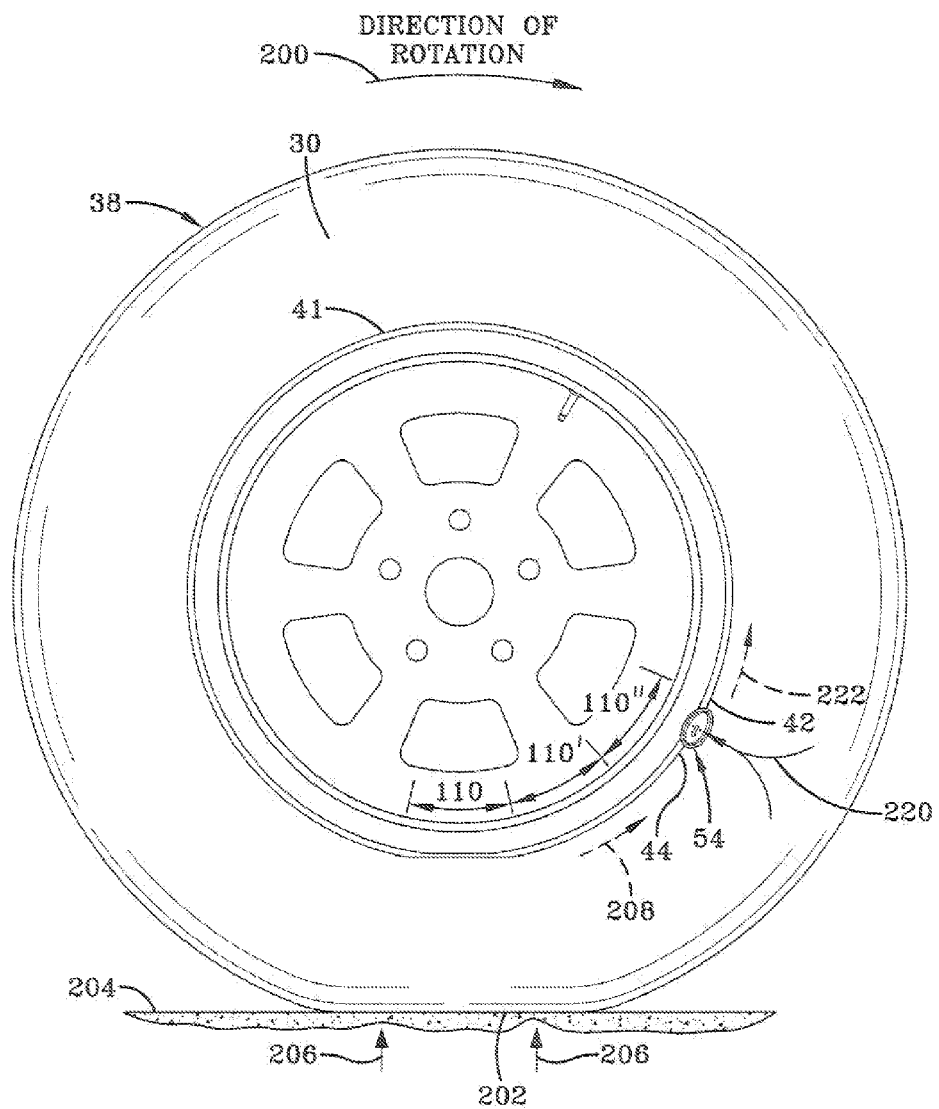
FIG. 3b illustrates a side view of the tire, wheel, tubing, and valves showing operation of the pump to the tire cavity when the tire rotates clockwise.

From the forgoing, it will be appreciated that the subject invention provides a peristaltic pump for a self-inflating tire in which a circular air tube 41 flattens segment by segment and closes in the tire footprint 202. The regulator device 54 may optionally include a filter (not shown). The peristaltic pump assembly 14 pumps air under rotation of the tire in one direction only for a given installation direction of the cap 120. If the cap is installed in the other direction in the body 70, the system pumps while the tire is rotating in the other direction as shown in FIG. 3B. The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
a tire mounted to a rim, the tire having a tire cavity, first and second sidewalls extending respectively from first and second tire bead regions to a tire tread region;
an air tube connected to the tire and defining an air passageway having an inlet end and an outlet end, the air tube being composed of a flexible material operative to allow a portion of the air tube segment to substantially close the annular passageway,
a regulator device connected to the inlet end and the outlet end of the air passageway, the regulator device including a regulator body mounted in the tire, and a cap connected to the regulator body, wherein the regulator body is connected to a duct having a first end located in the tire cavity, and a second end connected to a chamber formed between the cap and the regulator body;
a flexible ring being mounted in the chamber and having one or more slots; a pressure membrane mounted adjacent said ring;
said regulator body further comprising an inlet port for fluid communication with an outlet of end of the air tube and the chamber, and an outlet port for fluid communication with the chamber and an inlet end of the air passageway, and an ambient air inlet in fluid communication with the chamber and the pressure membrane;
said ring being positioned to seal the inlet port of the regulator body;
said regulator cap having a flanged portion about a recessed chamber, wherein the flanged portion is positioned for sealing engagement with the pressure membrane, and said recessed chamber being in fluid communication with the outlet port of the regulator body.

2. The self-inflating tire assembly of claim 1 wherein the regulator device has an outer surface that is flush with the outer surface of the tire.

3. The self-inflating tire assembly of claim 1 wherein the regulator device is mounted in the sidewall of the tire.

4. The self-inflating tire assembly of claim 1, wherein the air tube is sequentially flattened by the tire footprint to pump air along the air passageway in a forward tire direction of rotation.

5. The self-inflating tire assembly of claim 1, wherein the air tube is substantially of circular configuration.

6. The self-inflating tire assembly of claim 1, wherein the air tube is positioned between a tire bead region and a rim flange radially inward of the tire tread region.

7. The self-inflating tire assembly of claim 1, wherein the annular air tube is positioned between a tire bead region and the rim tire mounting surface radially inward of the tire tread region.

8. The self-inflating tire assembly of claim 1 wherein the regulator cap is reversible when installed on the regulator body.

9. A pressure regulator for an inflated tire having a tire cavity and mounted to a rim and connected to an inlet end and an outlet end of a peristaltic pump, the pressure regulator comprising:
a regulator device connected to the inlet end and the outlet end of the peristaltic pump, the regulator device including a regulator body and a cap connected to the regulator body, wherein the regulator body is connected to a duct having a first end located in the tire cavity, and a second end connected to a chamber formed between the cap and the regulator body;
a flexible ring being mounted in the chamber and having one or more slots; a pressure membrane mounted over said ring;
said regulator body further comprising an inlet port for fluid communication with an outlet of end of the peristaltic pump and the chamber, and an outlet port for fluid communication with the chamber and an inlet end of the peristaltic pump, and an ambient air inlet in fluid communication with the chamber and the pressure membrane;
said ring being positioned to seal the inlet port of the regulator body;
said regulator cap having a flanged portion surrounding a recessed chamber, wherein the flanged portion is positioned for sealing engagement with the pressure membrane, and said recessed chamber being in fluid communication with the outlet port of the regulator body.

10. A self-inflating tire assembly comprising:
a tire mounted to a rim, the tire having a tire cavity, first and second sidewalls extending respectively from first and second tire bead regions to a tire tread region;
an air tube connected to the tire, wherein each air tube defines an air passageway, each air tube being composed of a flexible material operative to allow a portion of the air tube segment to substantially open and close the annular passageway,
a regulator device connected to an inlet end of the air tube, the regulator device includes a regulator body mounted in the tire sidewall, the regulator body having an outer duct having a distal end located within the tire cavity, wherein the duct has an internal bore that is in fluid communication with the tire cavity and an internal chamber of the regulator body; a pressure membrane mounted within the internal chamber of the regulator body;
a cap mounted within the internal chamber of the regulator body and having a flanged end engageable with the pressure membrane, wherein the flanged end surrounds an internal cavity, the cap has an upper surface having one or more air holes that extend from the upper surface and are in fluid communication with the internal cavity, said internal cavity in fluid communication with an outlet port of the regulator body, wherein the outlet port is in fluid communication with an inlet end of the air tube.

11. The self-inflating tire assembly of claim 10 wherein the cap can be reversibly mounted within the regulator body.

12. A self-inflating tire assembly comprising:
a tire having a tire cavity, first and second sidewalls extending respectively from first and second tire bead regions to a tire tread region;
the tire further including an air passageway having an inlet end and an outlet end, wherein the air passageway is operative to open and close when the tire is rotated, a regulator device connected to the inlet end and the outlet end of the air passageway, the regulator device including a regulator body mounted in the tire, and a cap connected to the regulator body, wherein the regulator body is connected to a duct having a first end located in the tire cavity, and a second end connected to a chamber formed between the cap and the regulator body;

said regulator body further comprising an inlet port for fluid communication with an outlet of end of the air passageway and the chamber, and an outlet port for fluid communication with the chamber and an inlet end of the air passageway, and an ambient air inlet in fluid communication with the chamber and the pressure membrane;

a flexible ring mounted in the chamber and having one or more slots; a pressure membrane mounted adjacent said ring; said ring being positioned to seal the inlet port of the regulator body;

said regulator cap having a flanged portion surrounding a recessed chamber, wherein the flanged portion is positioned for sealing engagement with the pressure membrane, and said recessed chamber being in fluid communication with the outlet port of the regulator body.

* * * * *